US006209321B1

(12) United States Patent
Ikari

(10) Patent No.: US 6,209,321 B1
(45) Date of Patent: Apr. 3, 2001

(54) HYDRAULIC CONTROLLER FOR A WORKING MACHINE

(75) Inventor: Masanori Ikari, Sayama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/141,438

(22) Filed: Aug. 27, 1998

(30) Foreign Application Priority Data

Aug. 29, 1997 (JP) .................................................. 9-249340
Aug. 29, 1997 (JP) .................................................. 9-249341

(51) Int. Cl.[7] .................................................... F16D 31/02
(52) U.S. Cl. ................................ 60/422; 60/468; 91/444
(58) Field of Search ............................ 60/468, 422, 426; 91/444, 446

(56) References Cited

U.S. PATENT DOCUMENTS 4,967,557 * 11/1990 Izumi et al. ........................... 60/423
5,394,697 * 4/1995 Hirata ..................................... 60/426
5,950,430 * 9/1999 Tohji et al. ............................ 60/426

* cited by examiner

*Primary Examiner*—Edward K. Look
*Assistant Examiner*—Thomas E. Lazo
(74) *Attorney, Agent, or Firm*—Sidley & Austin

(57) ABSTRACT

The present invention relates to a hydraulic controller for a working machine, capable of reducing a dead zone of a lever of the working machine and improving the manipulation handling thereof. The hydraulic controller is provided with a back pressure metering valve disposed in a bleed-off line and connecting a bleed-off opening and a tank for adding back pressure to the bleed-off opening; a proportional solenoid control valve for supplying control pressure to the back pressure metering valve; a pilot hydraulic sensor for detecting pilot hydraulic pressure; and a controller for receiving a pilot hydraulic signal from the pilot hydraulic sensor and for outputting a control signal to the proportional solenoid control valve to thereby control the back pressure metering valve.

7 Claims, 14 Drawing Sheets

HYDRAULIC CONTROLLER FOR A WORKING MACHINE

FIELD OF THE INVENTION

The present invention relates to a hydraulic controller for a working machine as applied to cargo handling vehicles and the like.

BACKGROUND ART

Bleed-off control is widely used in hydraulic controllers for working machines to control the speed of an actuator by bleeding off a flow of hydraulic fluid from a hydraulic pump to a tank through a center bypass line of a directional control valve. The directional control valve, in the bleed-off control, starts to close a bleed-off opening, which is connected to the tank from a meter-in opening point. The meter-in opening, connected to the actuator, starts to open and reduces the bleed-off opening while increasing the meter-in opening according to a spool stroke to a bleed-off closing point, where an entire flow from the hydraulic pump is supplied to the actuator. When pilot hydraulic pressure, which is a linearly-increasing function in relation to a manipulated variable of a working machine lever, is supplied to a pilot portion of the directional control valve from a pilot proportional control valve, a spool of the directional control valve makes a stroke according to the pilot hydraulic pressure. Therefore, a rate of flow of pressurized oil, supplied to the actuator, changes according to the pilot hydraulic pressure, and the speed of the actuator is controlled.

Characteristics of the directional control valve in the bleed-off control will be described with reference to FIG. 14. A manipulated variable Ls of the working machine lever is shown along the horizontal axis. From a manipulated variable O at a neutral point (hereinafter referred to as a neutral point O), wherein a meter-in opening Ami is fully closed and an entire flow from the hydraulic pump is bled off to a manipulated variable Obo at the bleed-off closing point (hereinafter referred to as a bleed-off closing point Obo), where a bleed-off opening Abo is fully closed, as is shown with a continuous line, the directional control valve decreases the bleed-off opening Abo while increasing the meter-in opening Ami, according to a spool stroke of the directional control valve. With the manipulated variable Ls of the working machine lever shown on the horizontal axis and the pilot hydraulic pressure pp shown on a vertical axis, pilot hydraulic pressure F0, generated by the pilot proportional control valve, satisfies pilot hydraulic pressure pmi in a manipulated variable omi at the meter-in opening point (hereinafter referred to as a meter-in opening point Omi) and pilot hydraulic pressure pbo at the bleed-off closing point Obo, and is shown as a linearly-increasing function in relation to the manipulated variable Ls.

As is described above, the pilot hydraulic pressure F0 is shown as a linearly-increasing function in relation to the manipulated variable Ls, as is shown by a continuous line, and thus the spool stroke of the directional control valve also becomes a linearly-increasing function in relation to the manipulated variable Ls. Incidentally, on the horizontal axis of FIG. 14, the manipulated variable Ls and the spool stroke are shown at the same scale. Therefore, the neutral point O, the meter-in opening point Omi, the bleed-off closing point Obo, and the like are common in both the manipulated variable Ls and the spool stroke. Actuator flow rates Q in a loaded condition and in an unloaded condition, at engine rated speed, and actuator flow rates Q in a loaded condition and in an unloaded condition, at minimum idling engine speed, are respectively shown with continuous lines. When a cargo handling machine such as a bucket rises, actuator driving pressure P changes to pass actuator driving pressure P1, at an actuator starting point m1 in unloaded condition, and actuator driving pressure P2, at an actuator starting point m2, in loaded condition, as is shown with dashed lines.

(1) When a flow rate of pressurized oil, passing through the bleed-off opening Abo, is represented by Q, a difference in pressure before and after the bleed-off opening Abo is represented by ΔP, and a flow coefficient of a bleed-off opening is represented by C, it is known that the expression (1) applies:

$$Q=CAbo\cdot p^{1/2}$$

As the engine speed is decreased at a minimum idling engine speed, the discharge quantity of hydraulic fluid from the hydraulic pump, that is, the flow rate Q of pressurized oil flowing into the bleed-off opening Abo, decreases. It is necessary to reduce the bleed-off opening Abo to hold a predetermined actuator driving pressure P (P1 in an unloaded condition, and P2 in a loaded condition) even when the flow rate Q decreases, as can be seen in expression (1). Specifically, at an actuator starting point, the manipulated variable Ls of the working machine lever increases from m1 at an engine rated speed to n1 at a minimum idling engine speed in an unloaded condition, and from m2 at an engine rated speed to n2 at a minimum idling engine speed in a loaded condition.

(2) When engine speed is fixed and the flow rate Q of pressurized oil passing through the bleed-off opening Abo is fixed, as the working machine changes from an unloaded condition to a loaded condition, the actuator driving pressure P, for starting the actuator, increases from P1 in an unloaded condition to P2 in a loaded condition. Therefore, as can be seen in expression (1), it is necessary to make the stroke of the spool so that the bleed-off opening Abo will be reduced. Specifically, the manipulated variable at the actuator starting point increases from m1 in an unloaded condition to m2 in a loaded condition at an engine rated speed, and from n1 in an unloaded condition to n2 in a loaded condition at minimum idling engine speed.

The aforementioned prior art, however, has the following disadvantages.

(1) When an engine changes from an engine rated speed to a minimum idling engine speed, the discharge quantity of the hydraulic pump decreases and the flow rate Q of pressurized oil flowing into the directional control valve decreases. The manipulated variable Ls of the working machine lever increases from m1 to n1 at the actuator starting point in an unloaded condition and from m2 to n2 at the actuator starting point in a loaded condition. Moreover, as the working machine changes from an unloaded condition to a loaded condition and the actuator driving pressure P increases from P1 in an unloaded condition to P2 in a loaded condition, the manipulated variable of the working machine lever at the actuator starting point increases from m1 to m2 at an engine rated speed, and from n1 to n2 at minimum idling engine speed. Hence, there is a disadvantage in that a dead zone of the working machine lever to the actuator starting point increases.

(2) In a simultaneous manipulation in which an actuator load on a downstream side is larger than an actuator load on an upstream side, and when the difference between both of the above actuator load increases, most of the pressurized oil from the hydraulic pump flows to the actuator on the upstream side, whereby the quantity of pressurized oil of the actuator on the downstream side is decreased. Thus, the quantity of oil pressure on the downstream side is obtained by narrowing the bleed-off opening of the directional control valve on the downstream side to be in an almost fully closed condition while narrowing the bleed-off opening of the directional control valve on the upstream side, and by also increasing the meter-in opening. Accordingly, there is a disadvantage in that operability is lowered, since the manipulated variable of the directional control valve on the downstream side increases.

(3) When the flow rate Q of pressurized oil flowing into the directional control valve changes with a chance in the discharge quantity of the hydraulic pump, depending on engine speed, or the actuator driving pressure P chances depending on a working state of the working machine, the actuator starting point changes a substantial amount from ml and m2 at an engine rated speed to n1 and n2 at a minimum idling engine speed. Therefore, an operator needs to frequently revise the manipulation of the working machine lever depending on engine speed or load pressure of the actuator while watching the movement of the working machine, whereby there is a disadvantage in that operability is lowered.

(4) If the bleed-off opening Abo is reduced in size without changing the size of the meter-in opening Ami of the directional control valve in relation to the manipulated variable Ls, in order to decrease the manipulated variable Ls so that the actuator starting point will be m1 and m2 at an engine rated speed and n1 and n2 at a minimum idling engine speed, there is a disadvantage in that the flow rate Q, supplied from the meter-in opening Ami to the actuator, increases a substantial amount when the discharge quantity of the pump increases. If the meter-in opening Ami and the bleed-off opening Abo arc reduced in order to prevent the aforesaid disadvantage, there is a disadvantage in that the pressure loss in both openings Ami and Abo increases.

BRIEF SUMMARY OF THE INVENTION

The present invention is made to eliminate the aforementioned disadvantages of the prior art and its object is to provide a hydraulic controller for a working machine, which can improve handling for manipulation while reducing a dead zone of a working machine lever.

In a first aspect of the present invention, a hydraulic controller for a working machine has an actuator which drives the working machine, a hydraulic pump which supplies pressurized oil to the actuator, and a directional control valve which is disposed in a line connecting the hydraulic pump and the actuator. The hydraulic controller starts to close a bleed-off opening connected to a tank from a meter-in opening point, and a meter-in opening, connected to the actuator, starts to open, thereby reducing the bleed-off opening while increasing the meter-in opening, according to a stroke of a spool, to a bleed-off closing point, where the entire flow from the hydraulic pump is supplied to the actuator. A proportional pressure control valve, which generates pilot hydraulic pressure according to a manipulated variable of a lever of the working machine and supplies the generated pilot hydraulic pressure to a pilot portion of the directional control valve, includes:

- a back pressure metering valve, disposed in a bleed-off line connecting the bleed-off opening and the tank, for adding a back pressure to the bleed-off opening;
- a proportional solenoid control valve for supplying a control pressure to the back pressure metering valve;
- a pilot hydraulic sensor for detecting the generated pilot hydraulic pressure; and
- a controller for receiving a pilot hydraulic signal from the pilot hydraulic sensor and outputting a control signal to the proportional solenoid control valve to control the back pressure metering valve.

According to the aforementioned structure, a restriction pressure from the bleed-off opening and a back pressure from the back pressure metering valve are added to the upstream pressure of the directional control valve. Therefore, since the bleed-off opening becomes larger than the bleed-off opening without the back pressure metering valve, by an opening corresponding to the back pressure, even with a smaller manipulated variable of the working machine lever, the same upstream pressure is generated in the directional control valve, and the flow rate of the actuator is the same. Accordingly, the manipulated variable of the working machine lever (meter-in opening rate) can be reduced by a back pressure according to a pilot hydraulic pressure, thereby reducing a dead zone of the working machine lever. Moreover, a back pressure by the back pressure metering valve can be set at a desirable value by adjusting an opening of the back pressure metering valve according to the manipulated variable of the working machine lever (meter-in opening rate). Consequently, since the manipulated variable of the working machine lever increases when actuator load is large or a discharge quantity of the hydraulic pump is small, if the rate of reduction of the manipulated variable is set high, the difference in the manipulated variable in various work is reduced, thus improving handling for manipulation. Furthermore, the speed of the working machine and the rate of change in traveling force in relation to the manipulated variable can be adjusted, thereby also improving operability.

Moreover, the hydraulic controller of the working machine may be provided with:

- a load pressure sensor for detecting load pressure of the actuator;
- a pump discharge sensor for detecting a discharge quantity of the hydraulic pump; and
- a directional control valve input pressure sensor for detecting input pressure of the directional control valve. The controller may input a signal from each of the sensors and output a control signal to the proportional solenoid control valve so that a differential pressure between the directional control valve input pressure and the actuator load pressure will not exceed a fixed value while increasing the back pressure of the bleed-off opening, according to the increase in the detected pilot hydraulic pressure.

According to the aforementioned structure, the controller inputs a signal from each of the sensors and controls the back pressure metering valve through the proportional solenoid control valve, so that the back pressure of the bleed-off opening will be increased according to an increase in a pilot hydraulic pressure, and so that a differential pressure between the directional control valve input pressure and the actuator load pressure will not exceed a fixed value. As is described above, while the pump discharge quantity is small, the back pressure of the bleed-off opening is increased according to an increase in the pilot hydraulic pressure, and when the pump discharge quantity becomes large, the back pressure metering valve is controlled so that the differential pressure between the directional control valve input pressure and the actuator load pressure will not exceed a fixed value. Thus, the directional control valve input pressure does not rise excessively. In addition, even if the pump discharge quantity increases, the speed of the actuator can be maintained in proportion to the manipulated variable of the working machine, since it is determined by the manipulated variable of the working machine lever (meter-in opening rate).

Moreover, the hydraulic controller of the working machine may be provided with:

plurality of actuators;

a tandem circuit provided in each of a plurality of the actuators;

a plurality of directional control valves, proportional pressure control valves, pilot hydraulic sensors, and load pressure sensors, which are respectively disposed in correspondence to a plurality of the actuators; and a directional control valve input pressure sensor for detecting input pressure of a directional control valve disposed in uppermost reaches out of a plurality of the directional control valves.

The back pressure metering valve may be disposed in a bleed-off line of a directional control valve disposed in lowest reaches out of a plurality of the directional control valves. The controller may input a signal from each of the sensors and output a control signal to the proportional solenoid control valve, so that the difference between a maximum value of the pilot hydraulic pressure, detected by a plurality of the hydraulic sensors, and a maximum value of the load pressure, detected by a plurality of the load pressure sensors, will not exceed a fixed value.

According to the above structure, when one actuator out of the plurality of actuators is controlled by the corresponding directional control valve, the controller selects a pilot hydraulic pressure from the manipulated proportional pressure control valve and increases the back pressure of the bleed-off opening according to an increase in pilot hydraulic pressure. At the same time, the controller controls the back pressure metering valve through the proportional solenoid control valve, in accordance with the directional control valve input pressure in the uppermost reaches and the manipulated actuator load pressure, so that the differential pressure between the directional control valve input pressure and the actuator load pressure will not exceed the fixed value. Accordingly, even if there is a difference in each actuator load pressure, the back pressure metering valve is controlled, so as to compensate the maximum load pressure, and the input pressure of the directional control valve is raised, thereby improving operability of the downstream side without violating the priority of the upstream side, even when the actuator with the maximum load pressure is disposed on the downstream side.

Especially in simultaneous manipulation wherein actuator load on the downstream side is larger than actuator load on the upstream side, if the actuator load on the downstream side further increases, the input pressure of the directional control valve is increased by the back pressure metering valve so as to fix the differential pressure between the actuator load pressure and the directional control valve input pressure and supply pressurized oil to the actuator. Consequently, similar to independent manipulation, the manipulated variable of the directional control valve never increases by operating back pressure on the bleed-off opening, thus also improving operability of the actuator on the downstream side without violating the priority of the actuator on the upstream side with a tandem circuit.

In a second aspect of the present invention, a hydraulic controller for a working machine has an actuator which drives the working machine, a hydraulic pump which supplies pressurized oil to the actuator, and a directional control valve which is disposed in a line connecting the hydraulic pump and the actuator. The hydraulic controller starts to close a bleed-off opening connected to a tank from a meter-in opening point, and a meter-in opening, connected to the actuator, starts to open, thereby reducing the bleed-off opening while increasing the meter-in opening, according to a stroke of a spool, to a bleed-off closing point, where the entire flow from the hydraulic pump is supplied to the actuator. A proportional pressure control valve, which generates a pilot hydraulic pressure according to a manipulated variable of a lever of the working machine and supplies the generated pilot hydraulic pressure to a pilot portion of the directional control valve, includes:

a back pressure metering valve, disposed in a bleed-off line connecting the bleed-off opening and the tank, for receiving the generated pilot hydraulic pressure and increasing a back pressure of the bleed-off opening; and a pressure compensating valve, disposed in parallel with the back pressure metering valve in the bleed-off line, for controlling a differential pressure prior to the operation of the back pressure metering valve, for increasing back pressure when the differential pressure between input pressure of the directional control valve and load pressure of the actuator reaches a fixed value.

According to the aforementioned structure, a restriction pressure from the bleed-off opening and a back pressure from the back pressure metering valve are added to the upstream pressure of the directional control valve. Therefore, since the bleed-off opening is larger than the bleed-off opening without the back pressure metering valve, by an opening corresponding to the back pressure, the back pressure is added to restriction pressure by the bleed-off opening. With the addition of the back pressure, the upstream pressure of the directional control valve becomes the same, whereby pressurized oil can be equally supplied to the actuator. When a pump discharge quantity is small and a differential pressure between a directional control input pressure and an actuator load pressure does not reach a fixed value, the back pressure of the bleed-off opening is controlled by the back pressure metering valve so as to increase with pilot hydraulic pressure. When the pump discharge quantity increases, and the differential pressure between the directional control input pressure and the actuator load pressure reaches the fixed value, prior to the back pressure metering valve, the back pressure of the bleed-off opening is controlled so that the differential pressure between the directional control input pressure and the actuator load pressure will be fixed by the pressure compensating valve.

As is described above, when the pump discharge quantity is small, even in a small manipulated variable, an actuator flow rate is equal to an actuator flow rate in the case that the back pressure metering valve is not provided, thereby reducing a dead zone of the working machine lever. Besides, the back pressure by the back pressure metering valve can be set at a desirable value by adjusting an opening of the back pressure metering valve according to a manipulated variable. Accordingly, in the same way as the aforementioned first structure, manipulation handling and operability can be improved. When the pump discharge quantity increases, the back pressure from the bleed-off opening is controlled by the pressure compensating valve so that the differential pressure between the directional control valve input pressure and the actuator load pressure will be fixed. Hence, the speed of the actuator increases according to the manipulated variable of the working machine lever and the back pressure of the bleed-off opening no longer rises excessively. As a result, the directional control valve input pressure is prevented from becoming excessive, thus drastically improving operability and preventing a pressure loss from increasing.

In a third aspect of the present invention, a hydraulic controller for a working machine has an actuator which drives the working machine, a hydraulic pump which supplies pressurized oil to the actuator, and a directional control valve which is disposed in a line connecting the hydraulic pump and the actuator. The hydraulic controller starts to close a bleed-off opening connected to a tank from a meter-in opening point, and a meter-in opening, connected to the actuator, starts to open, thereby reducing the bleed-off opening while increasing the meter-in opening, according to a stroke of a spool, to a bleed-off closing point, where the entire flow from the hydraulic pump is supplied to the actuator. A proportional pressure control valve, which generates a pilot hydraulic pressure according to a manipulated variable of a lever of the working machine and supplies the generated pilot hydraulic pressure to a pilot portion of the directional control valve, includes:

a plurality of actuators;

a tandem circuit provided in each of the plurality of actuators;

a plurality of directional control valves and proportional pressure control valves which are respectively disposed in correspondence to the plurality of the actuators;

a pilot hydraulic pressure selection valve for selecting a maximum pilot hydraulic pressure from the pilot hydraulic pressure generated by the plurality of proportional pressure control valves;

a back pressure metering valve, disposed in a bleed-off line connecting a bleed-off opening of a directional control valve, disposed in lowest reaches out of a plurality of the directional control valves, and a tank, for receiving the maximum pilot hydraulic pressure and increasing the back pressure of the bleed-off opening;

a load pressure selection valve for selecting a maximum load pressure out of the load pressure of the plurality of the actuators; and a pressure compensating valve, disposed in parallel with the back pressure metering valve in a bleed-off line in which the back pressure metering valve is disposed, for controlling differential pressure fixedly prior to the operation of the back pressure metering valve for increasing back pressure when the differential pressure between input pressure of a directional control valve, disposed in uppermost reaches out of the plurality of directional control valves, and the selected maximum load pressure reaches a fixed value.

According to the aforementioned structure, when one actuator out of plural actuators is controlled by the corresponding directional control valve and the corresponding proportional pressure control valve, a pilot hydraulic pressure of the manipulated proportional pressure control valve is selected by the pilot hydraulic pressure selection valve and operates on the back pressure metering valve. At the same time, by operating the directional control valve input pressure in the uppermost reaches and the selected maximum load pressure on the pressure compensating valve, the manipulated actuator operates similarly to the aforementioned second structure, whereby the same effects can be obtained. Moreover, in simultaneous manipulation wherein an actuator load on the downstream side is larger than actuator load on the upstream side, the compensating pressure valve operates, thereby obtaining operation effects similar to those of the aforementioned first structure.

Furthermore, a back pressure relief valve may be disposed in place of the back pressure metering valve. According to such a structure, back pressure of the bleed-off opening generated by the back pressure relief valve can be controlled to have a correct and stable value, since the back pressure is set according to pilot pressure without changing with respect to a flow passing through the back pressure relief valve.

DETAILED DESCRIPTION OF THE INVENTION

Preferred embodiments of a hydraulic controller for a working machine according to the present invention will be described in detail with reference to the attached drawings.

Figure 1:
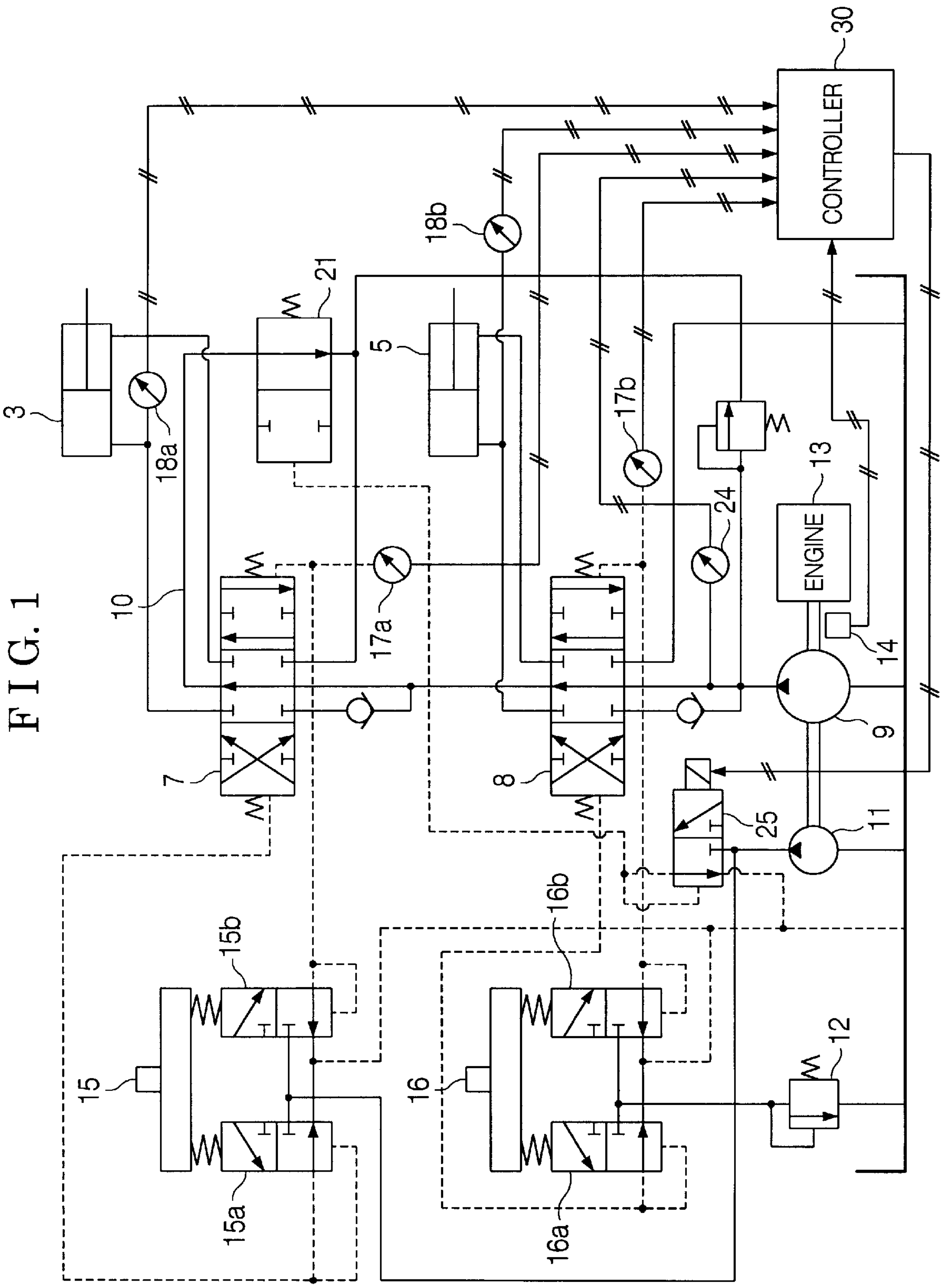
FIG. 1 is a schematic of a first embodiment of a hydraulic controller for a working machine according to the present invention.
Figure 2:
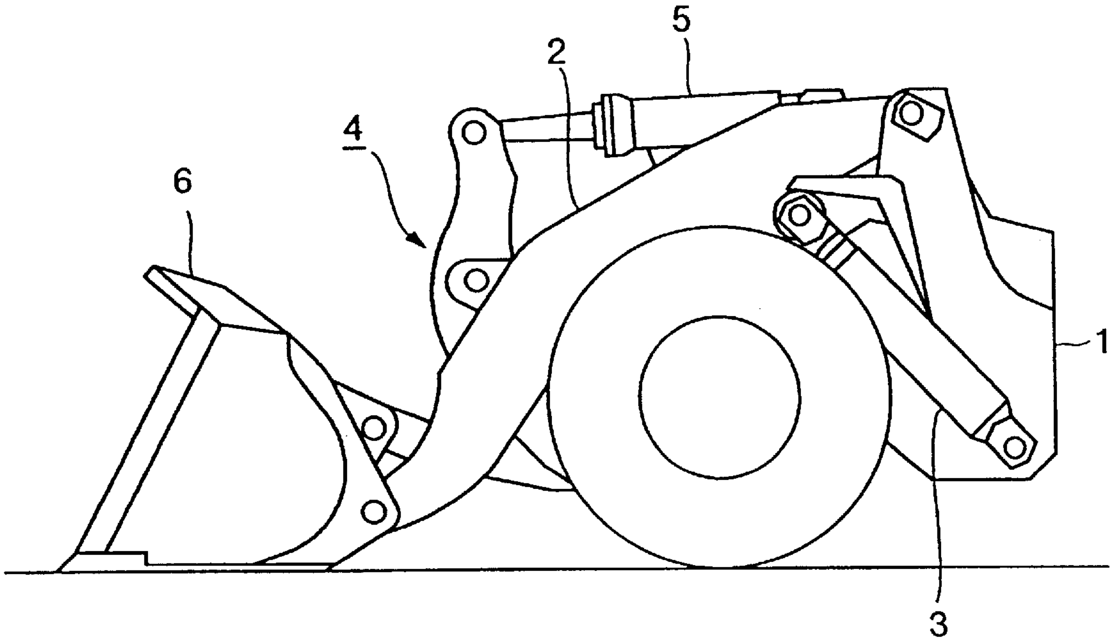
FIG. 2 is a side elevational view of a front portion of a cargo handling vehicle equipped with a hydraulic controller of a working machine according to the present invention.

A first embodiment of the present invention will be described with reference to FIG. 1 and FIG. 2. A boom 2 is attached to a forward body 1 of a vehicle with a boom hydraulic cylinder 3 so as to be rotatable. A bucket 6 is attached to the boom 2 through a bucket link 4 with a bucket hydraulic cylinder 5 so as to be rotatable about a pivot point. Directional control valves (a first directional control valve 7 and a second directional control valve 8, which are connected by a tandem circuit) are disposed in a line connecting a hydraulic pump 9, driven by an engine 13, and actuators (the boom hydraulic cylinder 3 and the bucket hydraulic cylinder 5), which drives working machines (the boom 2 and the bucket 6).

A back pressure metering valve 21 is disposed in a bleed-off line 10 connecting bleed-off openings of the downstream directional control valves 7 and 8 and a tank. Pilot hydraulic pressure, generated by the proportional pressure control valves 15*a*, 15*b*, 16*a*, and 16*b*, operates on pilot portions of the directional control valves 7 and 8 according to a manipulated variable Ls of the levers of the working machine (a boom lever 15 and a bucket lever 16). A quantity of discharged hydraulic oil from the hydraulic pump is detected by a pump discharge sensor 14. Pilot hydraulic pressure, generated by the proportional pressure control valves 15*b* and 16*b*, is detected by the pilot hydraulic sensors 17*a* and 17*b*. An actuator load pressure, from the actuators 3 and 5, is detected by the load pressure sensors 18*a* and 18*b*. An input pressure, from a directional control valve in the uppermost reaches, is detected by a directional control valve input pressure sensor 24. These detected values are respectively outputted to a controller 30. A proportional solenoid control valve 25 supplies control pressure, generated in accordance with a control signal inputted from the controller 30, to the back pressure metering valve 21. In this embodiment, the present invention is applied only when the boom 2 is raised and the bucket 6 is tilted.

According to structure of FIG. 1, operation of the present invention is as follows. Spool strokes, of the directional control valves 7 and 8, are controlled by the hydraulic pressure generated by the proportional pressure control valves 15*a*, 15*b*, 16*a*, and 16*b*, according to the manipulated variable Ls of the working machine levers 15 and 16. Therefore, pressurized oil, discharged from the hydraulic pump 9, is supplied to the actuators 3 and 5 according to the manipulated variable Ls of the working machine levers 15 and 16, so as to control the speed of the working machines 2 and 6. When a detected value of each sensor 14, 17*a*, 17*b*, 18*a*, 18*b*, or 24 is inputted to the controller 30, the controller 30 computes a control signal so that the differential pressure between directional control valve input pressure and actuator load pressure will not exceed a fixed value, while increasing back pressure of the bleed-off opening according to an increase in pilot hydraulic pressure. The proportional solenoid control valve 25 controls the back pressure metering valve 21 in accordance with the control signal from the controller 30.

Figure 3:
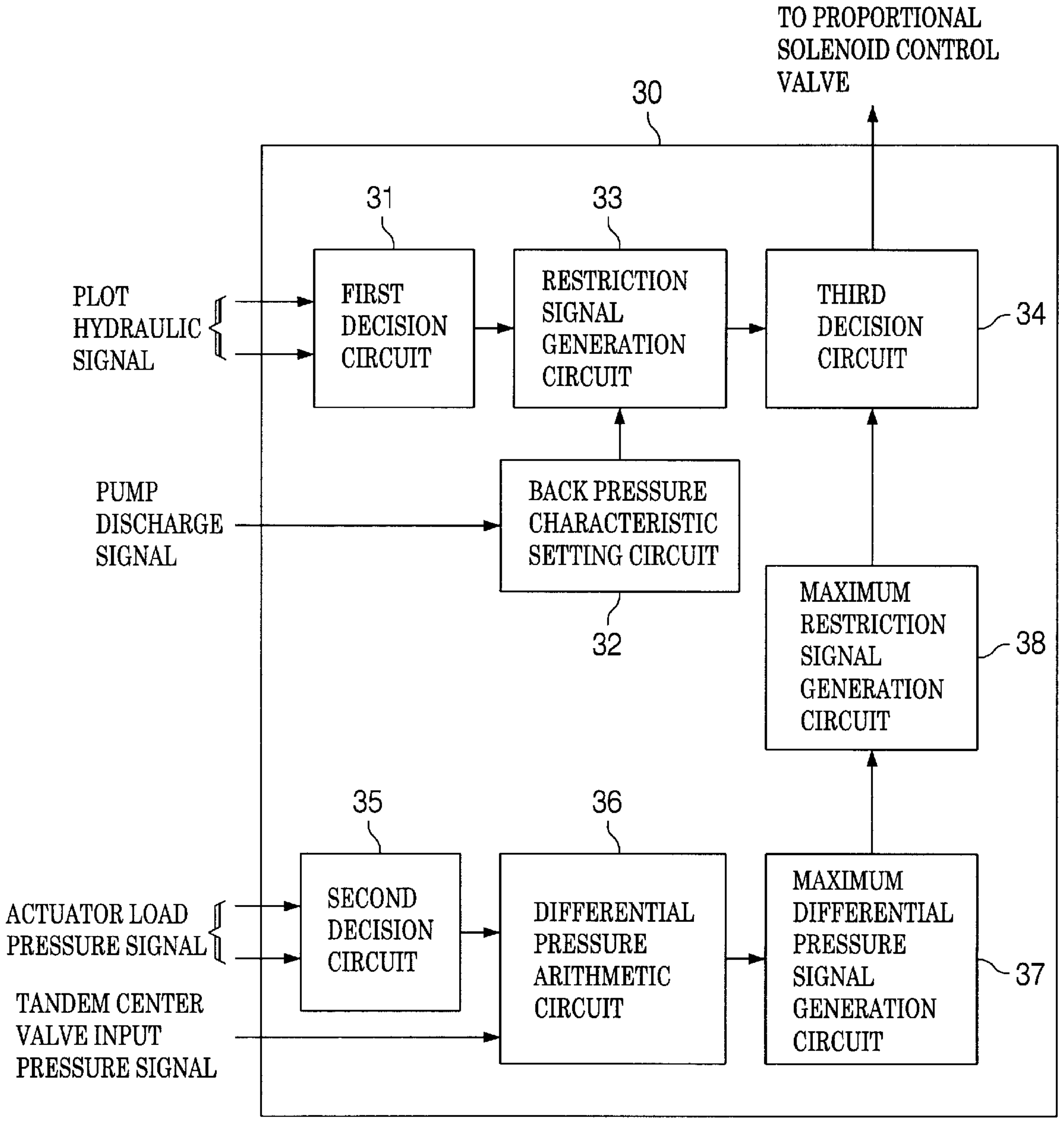
FIG. 3 is a block diagram of the controller shown in FIG. 1.

The operation of the controller 30 will be described in detail with reference to FIG. 1 and FIG. 3.

(1) After pilot hydraulic signals are inputted from the pilot hydraulic sensors 17*a* and 17*b*, a larger pilot hydraulic signal is selected in a first decision circuit 31 and outputted to a restriction signal generation circuit 33.

(2) After a pump discharge signal, detected by the pump discharge sensor 14, is inputted, back pressure characteristics of the back pressure metering valve 21 or a back pressure relief valve 23 are set in a back pressure characteristic setting circuit 32, and a back pressure characteristic signal is outputted to the restriction signal generation circuit 33. Here, the back pressure characteristics mean an opening of the back pressure metering valve 21 or a relief pressure of the back pressure relief valve 23 in relation to the manipulated variable Ls of the working machine levers 15 and 16.

(3) In the restriction signal generation circuit 33, a control signal, for increasing back pressure of the bleed-off opening according to an increase in pilot hydraulic pressure, is computed with the pilot hydraulic signal from the first decision circuit 31 and the back pressure characteristic signal from the back pressure characteristic setting circuit 32 and outputted to a third decision circuit 34.

(4) After actuator load pressure signals are inputted from the load pressure sensors 18*a* and 18*b*, a larger actuator load pressure signal is selected in the second decision circuit 35 and outputted to a differential pressure arithmetic circuit 36.

(5) After a directional control valve input pressure signal is inputted from the directional control valve input pressure sensor 24, a differential pressure between the directional control valve input pressure signal and the actuator load pressure signal, inputted from the second decision circuit 35, is computed in the differential pressure arithmetic circuit 36 and the computed value of differential pressure is outputted to a maximum differential pressure signal generation circuit 37.

(6) In the maximum differential pressure signal generation circuit 37, the computed value of differential pressure and a maximum differential pressure value, which is set in advance, are compared, and a maximum differential pressure signal is outputted to a maximum restriction signal generation circuit 38 only when the computed value of differential pressure reaches the maximum differential pressure value.

(7) In the maximum restriction signal generation circuit 38, a maximum restriction signal, in response to the maximum differential pressure signal, is outputted to the third decision circuit 34.

(8) In the third decision circuit 34, when the maximum restriction signal is generated, the maximum restriction signal is deducted from the control signal, which is inputted from the restriction signal generation circuit 33, and the output to the proportional solenoid control valve 25 is reduced so that the differential pressure between the directional control valve input pressure and the actuator load pressure will not exceed a fixed value.

While a pump discharge quantity is small and a flow rate supplied to the actuators 3 and 5 is low, the back pressure of the bleed-off opening is controlled by the back pressure metering valve 21 in response to the pilot hydraulic signal, since the differential pressure between the directional control valve input pressure and the actuator load pressure does not reach the fixed value. In this case, the upstream pressure of the directional control valves 7 and 8 in operation is added to the restriction pressure by the bleed-off opening and back pressure by the back pressure metering valve 21. Hence, even when the bleed-off opening is larger than the bleed-off opening in the manipulated variable of the working machine levers 15 and 16, without the back pressure metering valve 21 (hereinafter referred to as a reference manipulated variable), by an opening corresponding to the back pressure, that is, even in the small manipulated variable of the working machine levers 15 and 16 (hereinafter referred to as a set manipulated variable), the same upstream pressure occurs in the directional control valves 7 and 8, and the actuator flow rate becomes equal.

When the flow rate, supplied to the actuators 3 and 5, increases with an increase in pump discharge quantity, the back pressure of the bleed-off opening, prior to the pilot pressure signal, is controlled by the back pressure metering valve 21 so that the differential pressure between the directional control valve input pressure and the actuator load pressure will not exceed the fixed value. Thus, the speed of the actuators 3 and 5 increases according to the manipulated variable of the working machine levers 15 and 16 (meter-in opening rate), and the back pressure of the bleed-off opening no longer rises excessively, which prevents the directional control valve input pressure from becoming excessive.

Generally, a passing flow rate is proportional to a restriction area, when the differential pressure between the directional control valve input pressure and the actuator load pressure is fixed, as is shown by the equation:

$$Q=CA\cdot P^{1/2}$$

wherein:

Q=passing flow rate;

C=flow coefficient;

A=restriction area; and

P=differential pressure.

Thus , when a meter-in differential pressure exceeds the fixed value, the flow rate Q, supplied to the actuators 3 and 5, is controlled in proportion to the manipulated variable of the working machine levers 15 and 16 (meter-in opening rate) . Accordingly, even when the pump discharge quantity increases, more than a necessary rise in back pressure is prevented, thereby reducing pressure loss of the directional control valves.

Operation of the first embodiment of the present invention at an engine rated speed is described with reference to FIG. 4. The directional control valves 7 and 8 start to close bleed-off openings Abo, which are connected to the tank from a meter-in opening point Omi, wherein meter-in openings Ami, connected to the actuators 3 and 5, start to open. The directional control valves 7 and 8 reduce the bleed-off openings Abo while increasing the meter-in openings Ami, according to a spool stroke, to a bleed-off closing point obo, wherein an entire flow from the hydraulic pump 9 is supplied to the actuators 3 and S, as is shown with a phantom line. In the aforementioned directional control valves 7 and 8, the manipulated variable of the working machine levers 15 and 16, in which the starting point of the actuators is m1 (hereinafter referred to as an actuator starting point m1) in an unloaded condition, and m2 (hereinafter referred to as an actuator starting point m2) in a loaded condition.

A total bleed-off opening AB0, of the bleed-off opening Abo, and a back pressure metering valve opening Abp, connected thereto in series, is found by transforming a generally known expression $1/AB0^2=1/Abo^2+1/Abp^2$ to $ABO=Abo\cdot Abp/(Abo^2+Abp^2)^{1/2}$. Consequently, the manipulated variable of the working machine levers 15 and 16, in the total bleed-off opening AB0, which has the same opening area A as the bleed-off openings Abo at the actuator starting point m1 in an unloaded condition and at the actuator starting point m2 in a loaded condition, can be obtained. The manipulated variables, that is, an actuator starting point mla in an unloaded condition and an actuator starting point m2*a* in a loaded condition, can be obtained. The actuator driving pressure P changes, as is shown with a dashed line, which passes P1 at the actuator starting point m1a in an unloaded condition and P2 at the actuator starting point m2*a* in a loaded condition. It is known that the actuator driving pressure P, with the maximum restriction control of the back pressure metering valve 21, rises more slowly than with only the pilot hydraulic control of the back pressure metering valve 21. The actuator flow rate Q, from the bleed-off opening Ab0, is shown with a phantom line and the actuator flow rate Q, from the total bleed-off opening ABO, is shown with a continuous line.

The operation of the first embodiment of the present invention at a minimum idling engine speed is described with reference to FIG. 5. Concerning the directional control valves 7 and 8, FIG. 5 is similar to FIG. 4. In the directional control valves 7 and 8, the manipulated variable of the working machine levers 15 and 16, which is the starting point of the actuators, is n1 (hereinafter referred to as an actuator starting point n1) in an unloaded condition, and n2 (hereinafter referred to as an actuator starting point n2) in a loaded condition.

Figure 4:
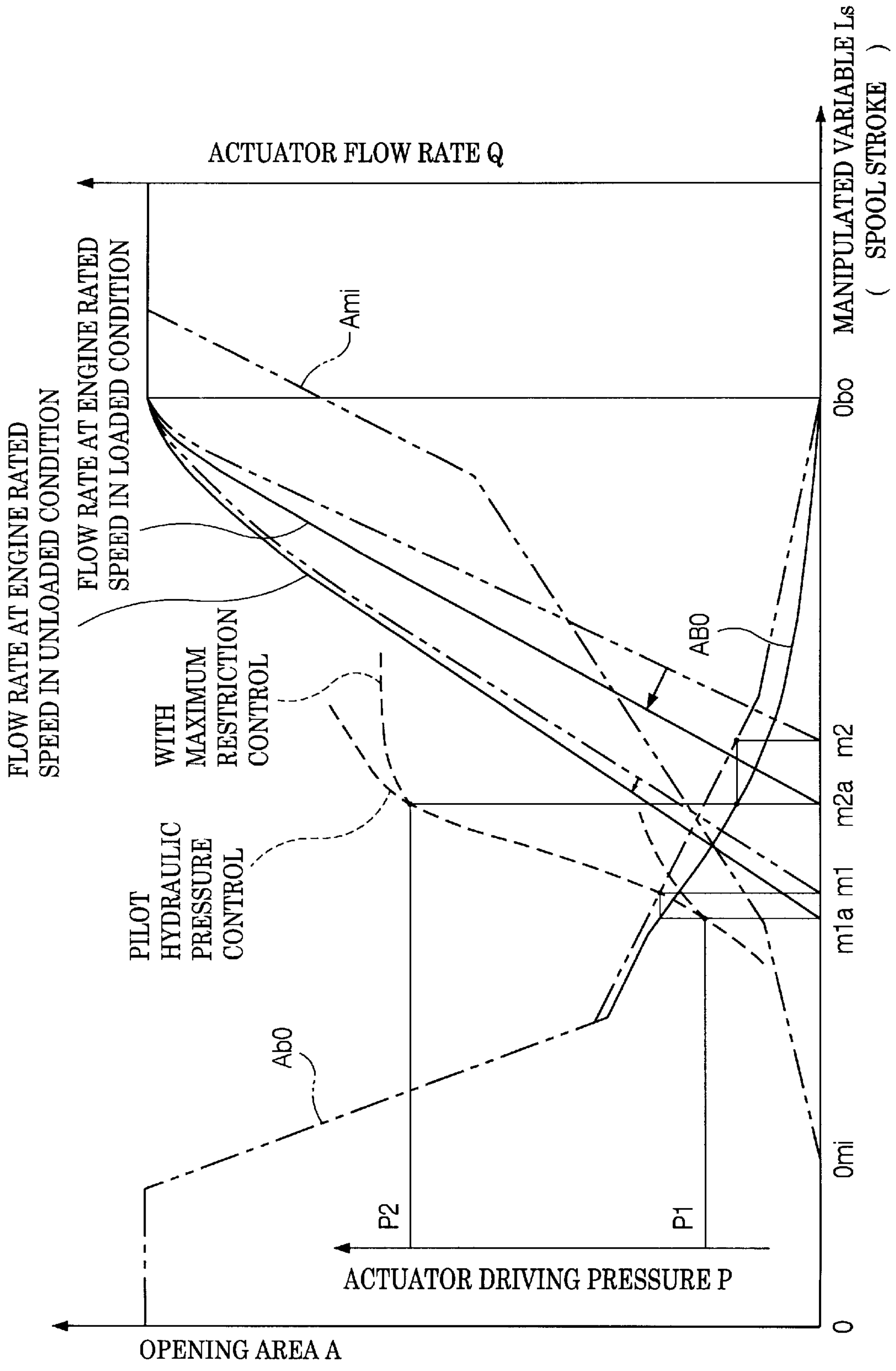
FIG. 4 is a graphical view of the operation, at an engine rated speed, of the first embodiment of the present invention.
Figure 5:
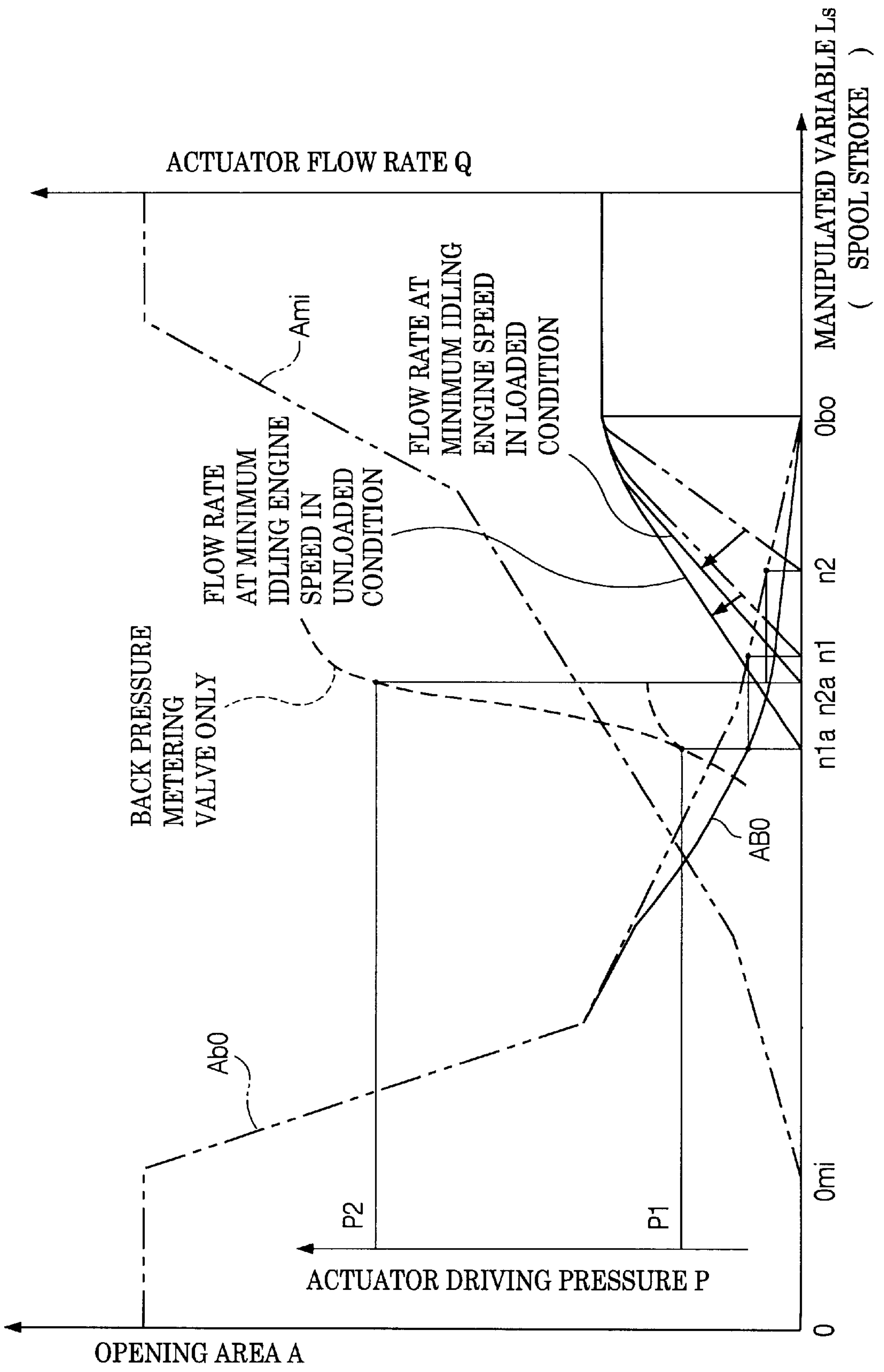
FIG. 5 is a graphical view of the operation, at a minimum idling engine speed, of the first embodiment of the present invention.

In FIG. 5, similarly to FIG. 4, from the relationship between the bleed-off opening Abo and the total bleed-off opening AB0, the manipulated variable of the working machine levers 15 and 16 in the total bleed-off opening AB0, which has the same opening area A as the bleed-off openings Abo at the actuator starting points n1 and at n2, that is, an actuator starting point n1*a* in unloaded condition and an actuator starting point n2*a* in loaded condition, can be obtained. In the actuator driving pressure P, there is no difference between the case of having only pilot hydraulic control of the back pressure metering valve 21 and the case of having the maximum restriction control of the back pressure metering valve 21. The actuator flow rate Q by the bleed-off opening Ab0 is shown with a phantom line and the actuator flow rate Q by the total bleed-off opening ABO is shown with a continuous line.

As is described above with reference to FIG. 4 and FIG. 5, the actuator starting points m1, m2, n1, and n2 are moved to the actuator starting points m1*a*, m2*a*, n1*a*, and n2*a*, respectively in a direction of the meter-in opening point Omi by (m1–m1*a*), (m2–m2*a*), (n1–n1*a*), and (n2–n2*a*). As a result, a dead zone from the start of manipulation of the working machine levers 15 and 16 to the start of movement of the actuators 3 and 5 can be reduced. Moreover, since the total bleed-off opening AB0 in relation to the manipulated variable of the working machine levers 15 and 16 can be optionally set, (m1–m1*a*)≦(m2–m2*a*), (n1–n1*a*)≦(n2–n2*a*), and further (n1*a*–m2*a*)≦(n1–m2) can be set. Specifically, the difference between the actuator starting points m2*a* and mia at an engine rated speed, the difference between the actuator starting points n2*a* and n1*a* at a minimum idling engine speed, and the difference between the actuator starting point n1*a* at a minimum idling engine speed and the actuator starting point m2*a* at an engine rated speed, reduce. Thus, the difference in working machine lever manipulated variable, which differs depending on an actuator load or a hydraulic pump discharge quantity, reduces, thereby improving manipulation handling. In addition, the rate of speed change of the working machine in relation to the manipulated variable Ls of the levers 15 and 16 reduces, thereby improving fine operability. Furthermore, the actuator driving pressure P can be perceived by change range of the manipulated variable Ls of the working machine levers 15 and 16, thus improving feeling for manipulation in relation to actuator load.

Figure 6:
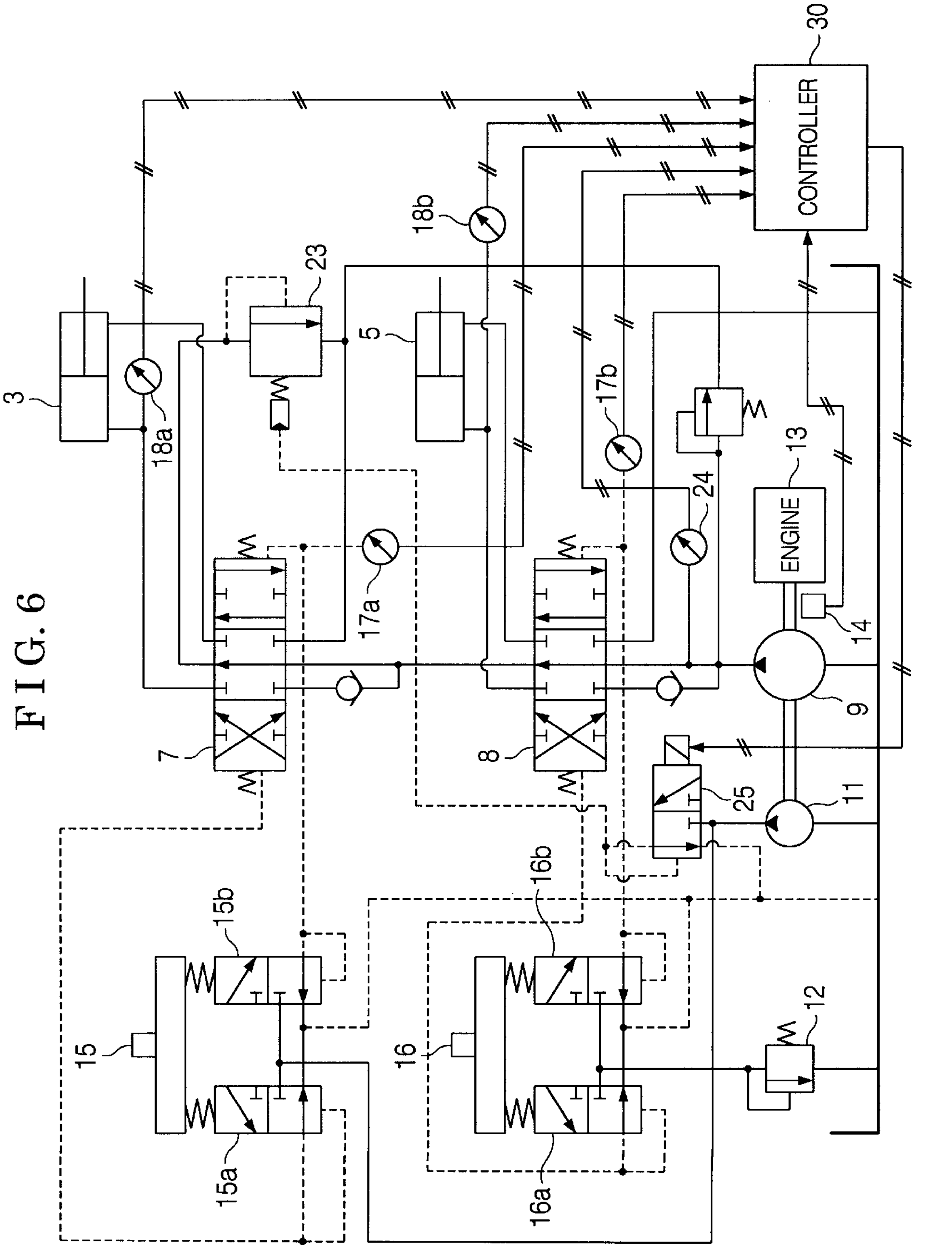
FIG. 6 is a schematic of a second embodiment of a hydraulic controller of a working machine according to the present invention.

A second embodiment of the present invention is described with reference to FIG. 6. In the second embodiment, as compared to the first embodiment, a back pressure relief valve 23 is substituted for the back pressure metering valve 21, and a control pressure is a pilot hydraulic pressure from the proportional pressure control valves 15*b* and 16*b*. The back pressure metering valve 21, in FIG. 1 controls an opening of the back pressure metering valve 21 by pilot hydraulic pressure, whereas the back pressure relief valve 23 controls a back pressure by a pilot hydraulic pressure. Accordingly, in the back pressure metering valve 21, if the flow rate changes, even at the same pilot pressure, the restriction pressure changes. In the back pressure relief valve 23, however, if a pilot hydraulic pressure does not change, the restriction pressure does not change even when the flow rate changes. In this respect, the above two valves greatly differ.

The operation at an engine rated speed in the second embodiment will be described with reference to FIG. 7.

Figure 7:
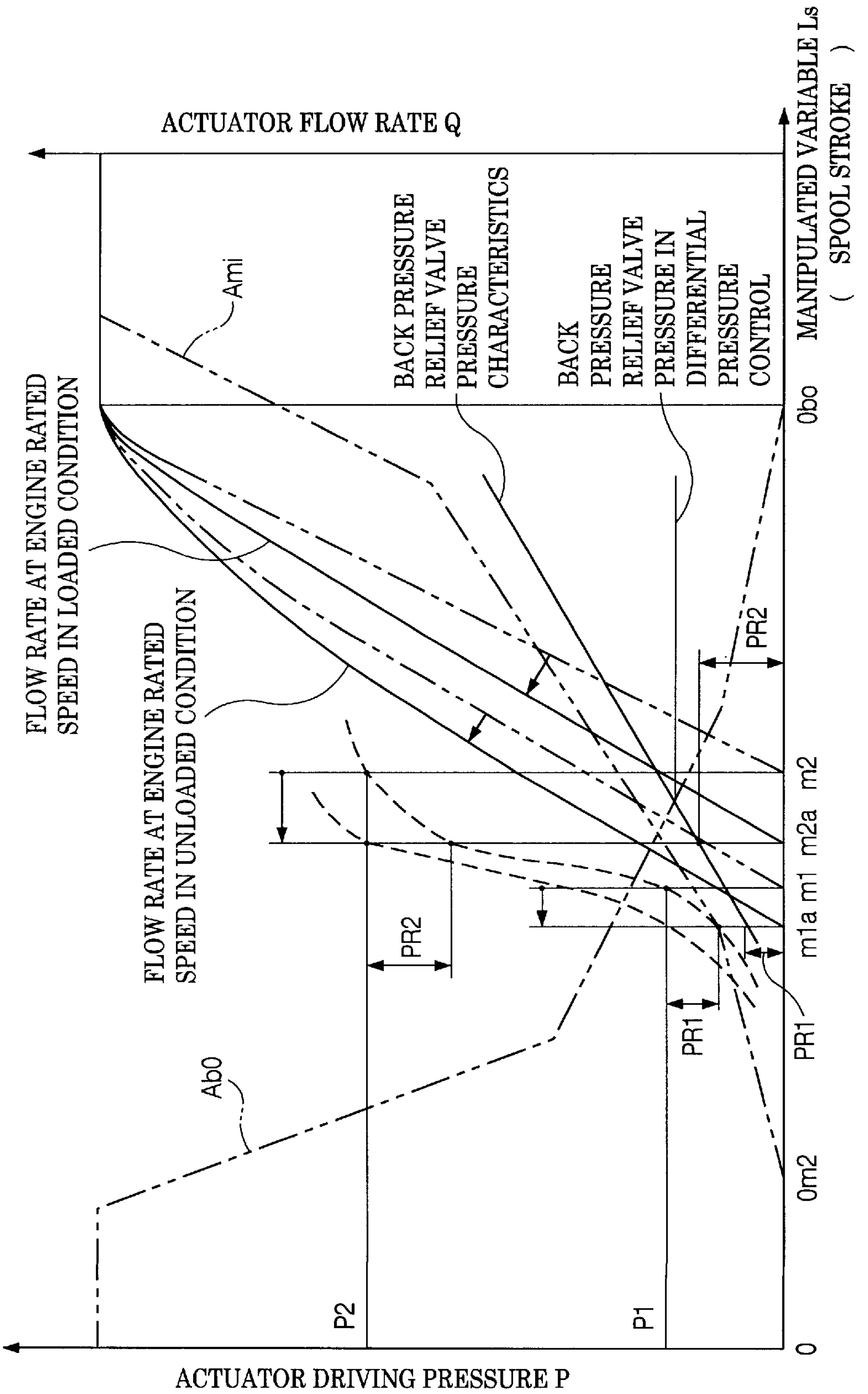
FIG. 7 is a graphical view of the operation, at an engine rated speed, of the second embodiment of the present invention.

Concerning the actuator starting points m1 and m2 of the bleed-off opening Abo, FIG. 7 is similar to FIG. 4. The actuator flow rate Q from the bleed-off opening Abo is shown with a phantom line and the actuator flow rate Q from the bleed-off opening Abo, to which back pressure by the back pressure relief valve 23 is added, is shown with a continuous line. The actuator driving pressure P changes, as is shown with a dashed line, which passes P1 in an unloaded condition and P2 in a loaded condition. In the manipulated variable m1a, to which the manipulated variable of the actuator starting point m1 is decreased by a predetermined variable, the actuator driving pressure P1 in an unloaded condition is the total driving pressure, which the actuator driving pressure P and back pressure PR1, generated by the back pressure relief valve 23, add up to. In other words, the generating back pressure of the back pressure relief valve 23 is determined so that the manipulated variable m1*a* will be an actuator starting point in an unloaded condition. Moreover, in the manipulated variable m2*a*, to which the manipulated variable of the actuator starting point m2 is decreased by a predetermined variable, the actuator driving pressure P2 in a loaded condition is the total driving pressure, which the actuator driving pressure P and back pressure PR2, generated by the back pressure relief valve 23, add up to. In other words, generating a back pressure from the back pressure relief valve 23 is determined so that the manipulated variable m2*a* will be an actuator starting point in a loaded condition.

Figure 8:
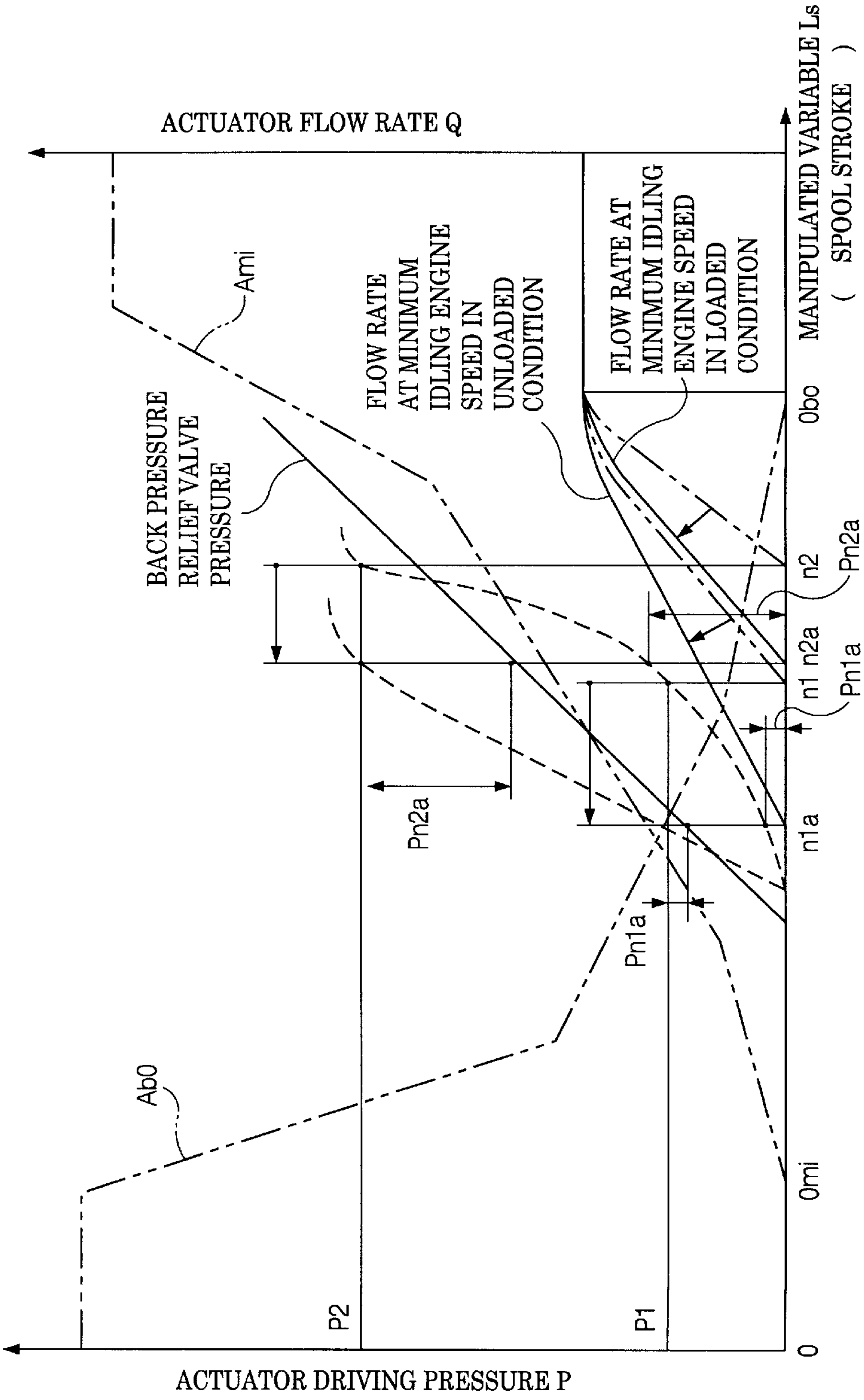
FIG. 8 is a graphical view of the operation, at a minimum idling engine speed, of the second embodiment of the present invention.

The operation at a minimum idling engine speed in the second embodiment is described with reference to FIG. 8. Concerning the actuator starting points n1 and n2 of the bleed-off opening Abo, FIG. 7 is similar to FIG. 5. The actuator flow rate Q, from the bleed-off opening Abo, is shown with a phantom line and the actuator flow rate Q from the bleed-off opening Abo, to which back pressure by the back pressure relief valve 23 is added, is shown with a continuous line. The actuator driving pressure P changes, as is shown with a dashed line, which passes P1 in unloaded condition and P2 in loaded condition. In the set manipulated variable n1*a*, to which the manipulated variable of the actuator starting point n1 is decreased by a predetermined variable, the actuator driving pressure P1 in unloaded condition is a total value which a back pressure generated by the back pressure relief valve 23 and the actuator driving pressure Pn1*a* add up to. In other words, generating a back pressure from the back pressure relief valve 23 is determined so that the manipulated variable n1*a* will be an actuator starting point in an unloaded condition. Moreover, in the set manipulated variable n2*a*, to which the manipulated variable of the actuator starting point n2 is decreased by a predetermined variable, the actuator driving pressure P2, in a loaded condition, is a total value which back pressure, generated by the back pressure relief valve 23 and the actuator driving pressure Pn2*a*, add up to. In other words, generating back pressure from the back pressure relief valve 23 is determined so that the manipulated variable n2*a* will be an actuator starting point in a loaded condition.

As is described above with reference to FIG. 7 and FIG. 8, the actuator starting points m1, m2, n1, and n2, from the bleed-off opening Abo, are moved to the actuator starting points m1*a*, m2*a*, n1*a*, and n2*a* by the bleed-off opening Abo, to which back pressure by the back pressure relief valve 23 is added, respectively, in a direction of the meter-in opening point Omi, by (m1–m1*a*), (m2–m2*a*), (n1–n1*a*), and (n2–n2*a*)- As a result, a dead zone from the start of manipulation of the working machine levers 15 and 16 to the start of movement of the actuators 3 and 5 can be reduced.

Moreover, since back pressure from the back pressure relief valve 23 can be optionally set in relation to the manipulated variable of the working machine levers 15 and 16, (m1–m1*a*)≦(m2–m2*a*), (n1–n1*a*)≦(n2–n2*a*), and further (n1*a*–m2*a*)≦(n1–m2) can be set. Specifically, the difference between the actuator starting point m2*a*, in a loaded condition, and the actuator starting point m1*a*, in an unloaded condition, at an engine rated speed; the difference between the actuator starting point n2*a*, in a loaded condition, and the actuator starting point n1*a*, in an unloaded condition, at a minimum idling engine speed; and the difference between the actuator starting point n1*a*, in an unloaded condition, at minimum idling engine speed, and the actuator starting point m2*a*, in a loaded condition, at engine rated speed, reduce. Thus, the differences in manipulated variables of working machine levers, which differ depending on actuator load or a hydraulic pump discharge quantity, are reduced, thereby improving manipulation handling. Incidentally, concerning improvement in fine operability and manipulation handling in relation to an actuator load, the second embodiment is similar to the first embodiment.

In the first and second embodiments, the control of more than one actuator was disclosed. The first decision circuit 31 and the second decision circuit 35, in the controller 30, can be omitted when one actuator is controlled.

Figure 9:
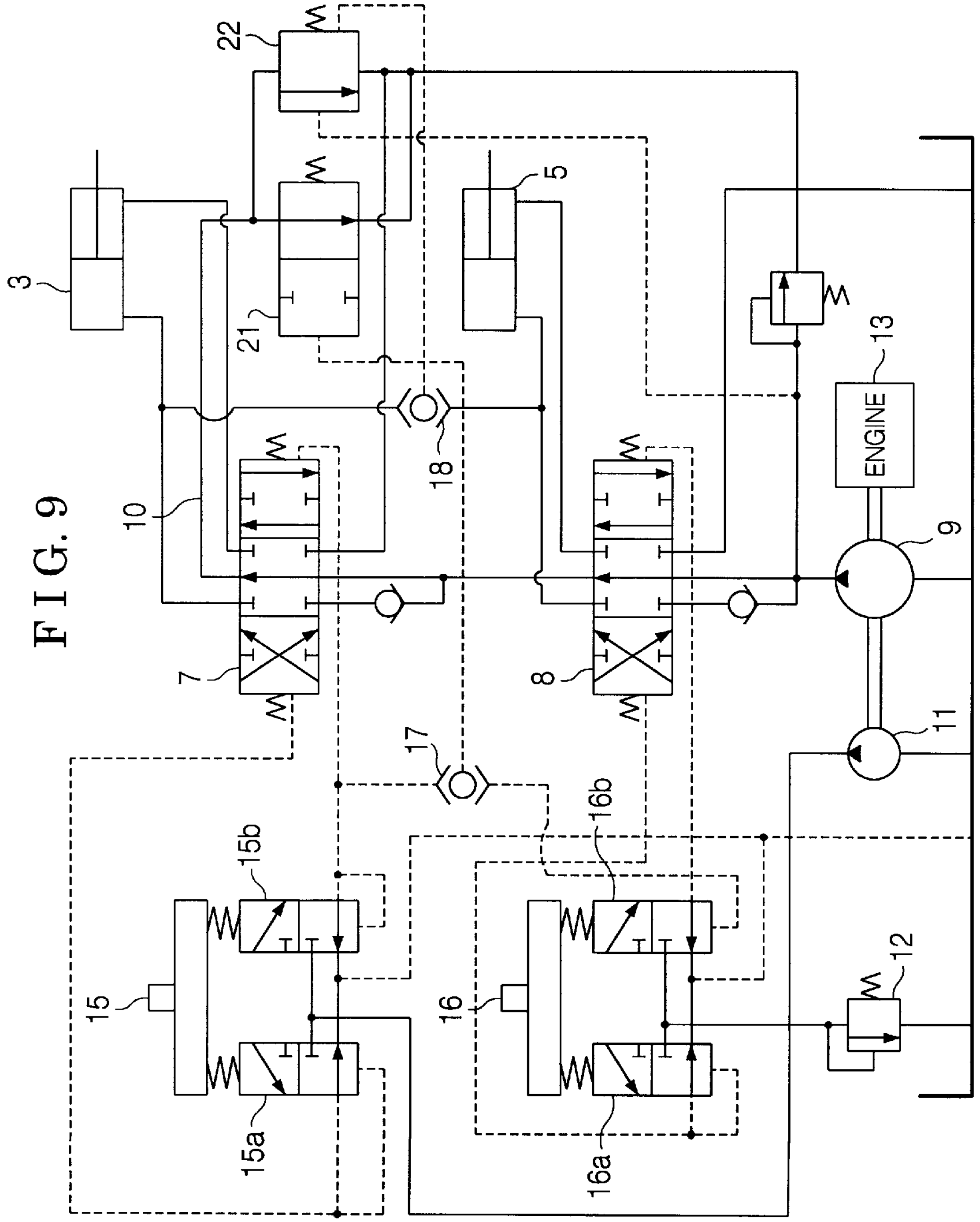
FIG. 9 is a schematic of a third embodiment of a hydraulic controller of a working machine according to the present invention.

A third embodiment of the present invention is described with reference to FIG. 9. The back pressure metering valve 21 and a pressure compensating valve 22 are disposed, in parallel, in a bleed-off line 10 connecting the bleed-off opening of the directional control valve 7 on a downstream side and the tank. Pilot hydraulic pressure, generated by the proportional pressure control valves 15*a*, 15*b*, 16*a*, and 16*b*, operates on pilot portions of the directional control valves 7 and 8, according to the manipulated variable Ls of the working machine levers (the boom lever 15 and the bucket lever 16). The pilot hydraulic pressure, generated by the proportional pressure control valves 15*b* and 16*b*, is selected by a pilot hydraulic pressure selection valve 17 (hereinafter referred to as a shuttle valve 17) and operates on a pilot portion of the back pressure metering valve 21. Actuator load pressure of the boom hydraulic cylinder 3 or the bucket hydraulic cylinder 6 is selected by a load pressure selection valve 18 (hereinafter referred to as a shuttle valve 18) and operates on each pilot portion of the pressure compensating valve 22 together with directional control valve input pressure in the uppermost reaches. In this embodiment, the present invention is applied only when the boom 2 is raised and the bucket 6 is tilted.

According to the structure of FIG. 9, operation is as follows. Spool strokes of the directional control valves 7 and 8 are controlled by a pilot hydraulic pressure generated by the proportional pressure control valves 15*a*, 15*b*, 16*a*, and 16*b* according to the manipulated variable Ls of the working machine levers. Therefore, pressurized oil, discharged from the hydraulic pump 9, is supplied to the actuators 3 and 5 according to the manipulated variable Ls of the working machine levers 15 and 16, so as to control the speed of the working machines 2 and 6. In addition, a larger pilot hydraulic pressure, out of the pilot hydraulic pressure generated by the proportional pressure control valves 15*b* and 16*b*, is selected by the shuttle valve 17, and back pressure from the hydraulic metering valve 21, is controlled to rise with rise in pilot hydraulic pressure. A larger load pressure, out of the load pressure of the boom hydraulic cylinder 3 or the bucket hydraulic cylinder 5, is selected by the shuttle valve 18 and operates on the pressure compensating valve 22 together with directional control valve input pressure of the directional control valve 8. According to this operation, when a differential pressure between a directional control valve input pressure and an actuator load pressure reaches a fixed value, the back pressure of the bleed-off opening, prior to the back pressure metering valve 21, is controlled so that the differential pressure will not exceed the fixed value.

While a pump discharge quantity is small and a flow rate supplied to the actuators 3 and 5 is low, the back pressure from the bleed-off opening is controlled by the back pressure metering valve 21, since the differential pressure between the directional control valve input pressure and the actuator load pressure does not reach the fixed value. In this case, the upstream pressure of the directional control valves 7 and 8 in operation is a pressure to which the restriction pressure from the bleed-off opening and the back pressure from the back pressure metering valve 21 are added. Hence, the bleed-off opening becomes larger than the bleed-off opening in the manipulated variable of the working machine levers 15 and 16, without the back pressure metering valve 21, by an opening corresponding to back pressure. Therefore, even in a manipulated variable smaller than a manipulated variable without the back pressure metering valve 21, the same upstream pressure is generated and the actuator flow rate becomes equal.

When the flow rate supplied to the actuators 3 and 5 increases with an increase in pump discharge quantity, the pressure compensating valve 22 controls the back pressure of the bleed-off opening, prior to the back pressure metering valve 21, so that the differential pressure between the directional control valve input pressure and the actuator load pressure will not exceed the fixed value. Thus, the speed of the actuators 3 and 5 increases according to the manipulated variable of the working machine levers 15 and 16 (meter-in opening rate) and, moreover, the back pressure of the bleed-off opening no longer rises too much, which prevents the directional control valve input pressure from becoming excessive. When a flow rate, passing through a restriction, is represented by Q, a flow coefficient is represented by C, a restriction area is represented by A, and a differential pressure is represented by P. Q is proportional to A, as is known from an expression $Q=CA\cdot p^{1/2}$, when the differential pressure P between directional control valve input pressure and actuator load pressure is fixed. Thus, when meter-in differential pressure exceeds the set pressure, the flow rate Q supplied to the actuators 3 and 5 is controlled in proportion to the manipulated variable of the working machine levers 15 and 16 (meter-in opening rate). Accordingly, even when the pump discharge quantity is large, a greater than necessary rise in back pressure is prevented, thereby reducing pressure loss from the directional control valve.

Figure 10:
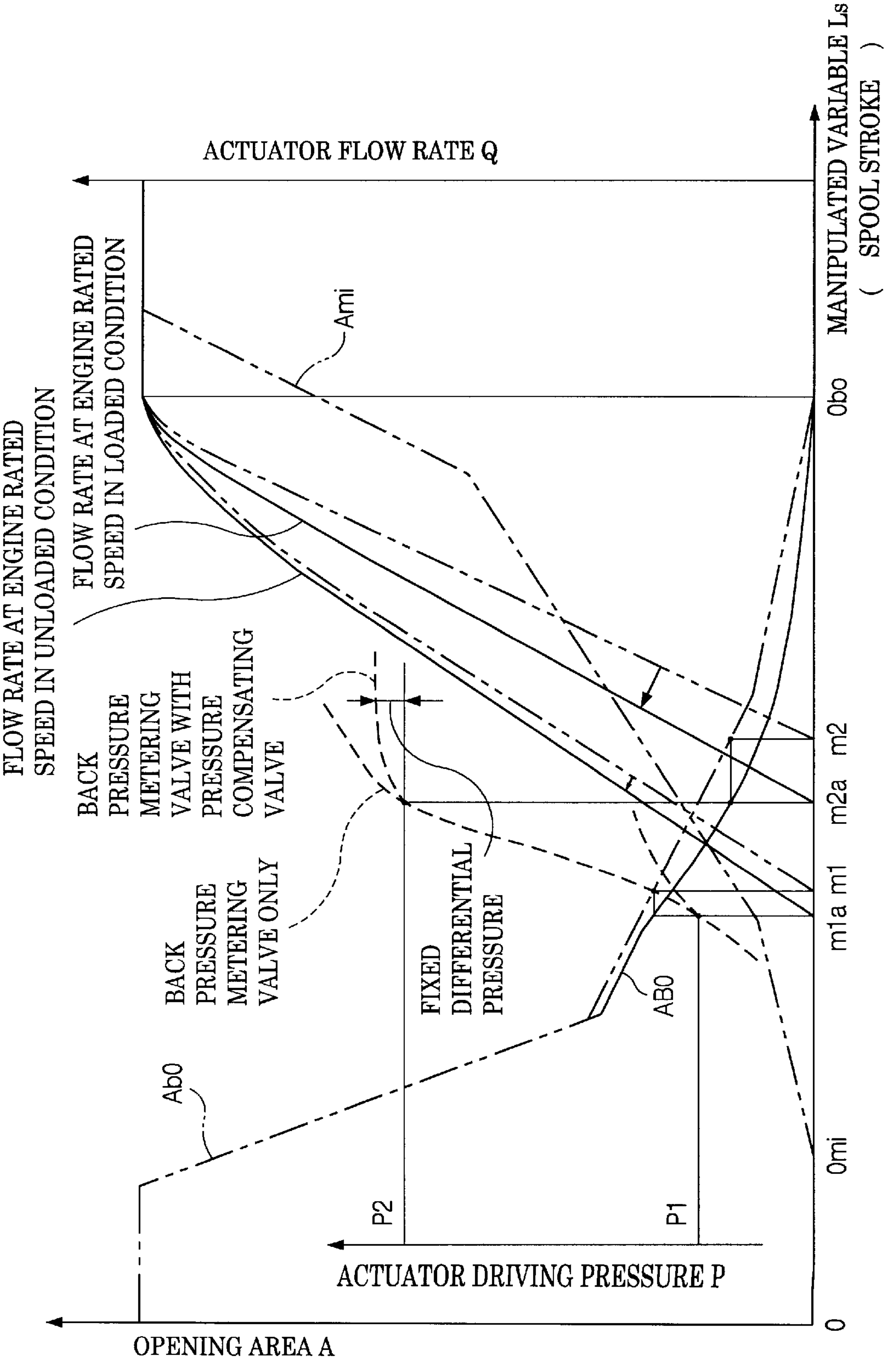
FIG. 10 is a graphical view of the operation, at an engine rated speed, of the third embodiment of the present invention.

The operation at an engine rated speed in a third embodiment will be described with reference to FIG. 10. The operation in the third embodiment is similar to FIG. 4 of the first embodiment; therefore, only the actuator driving pressure P will be described. The actuator driving pressure P changes as is shown with a dashed line from P1 in unloaded condition to P2 in loaded condition. It is known that the actuator driving pressure rises more slowly compared to the situation wherein there is only the back pressure metering valve 21 without the pressure compensating valve 22. The actuator flow rate Q from the bleed-off opening Abo is shown with a phantom line and the actuator flow rate Q by the total bleed-off opening AB0 is shown with a continuous line.

Figure 11:
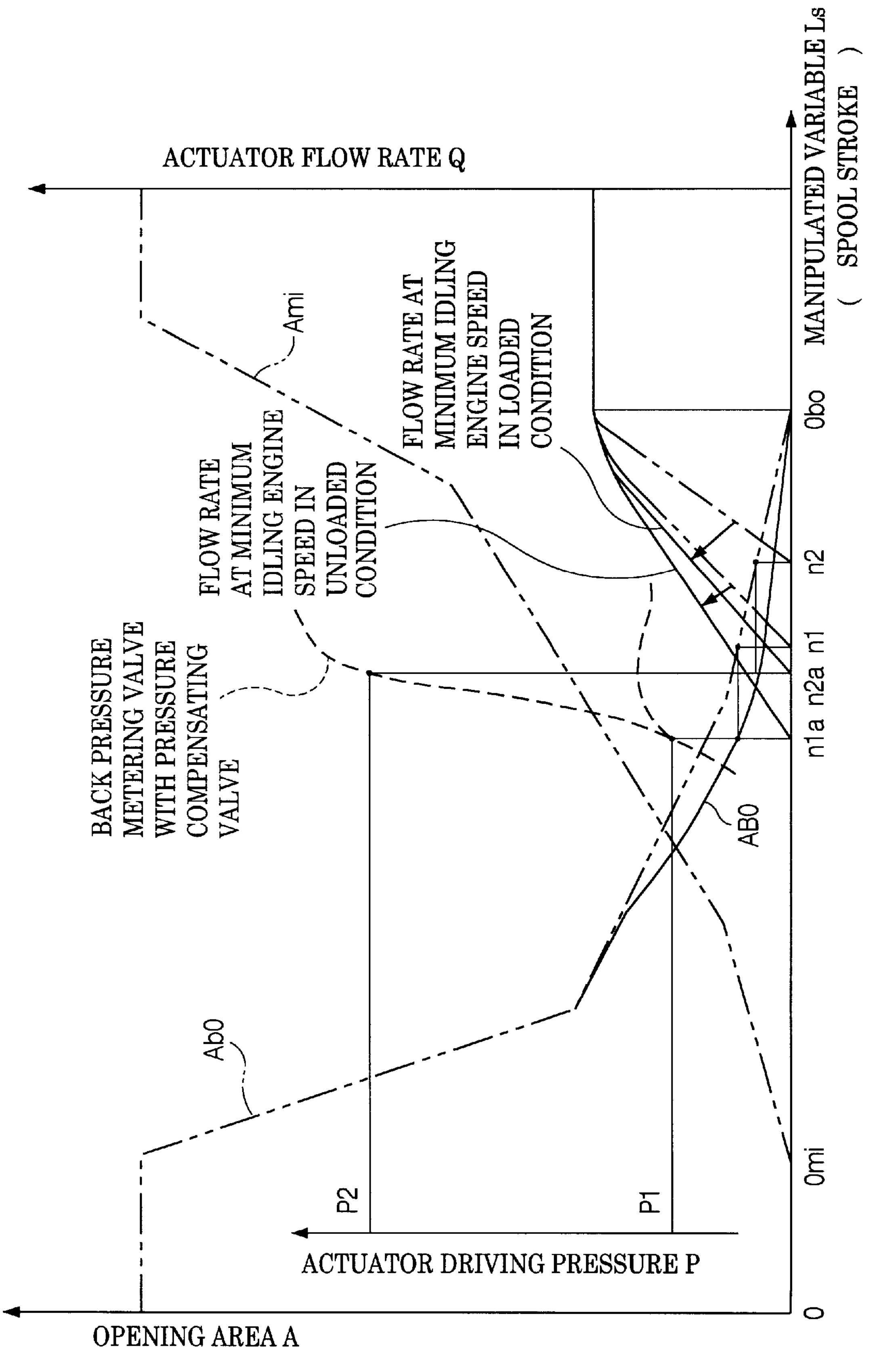
FIG. 11 is a graphical view of the operation, at a minimum idling engine speed, of the third embodiment of the present invention.

The operation at a minimum idling engine speed in the third embodiment will be described with reference to FIG. 11. In this embodiment, in the same way as the explanation of FIG. 4, the actuator starting point m1*a* in an unloaded condition and the actuator starting point m2*a* in a loaded condition can be obtained. In the actuator driving pressure P in this embodiment, there is no difference between the case of the back pressure metering valve 21 with the pressure compensation valve 22 and the case of the back pressure metering valve 21 only.

As is described above, the operation at an engine rated speed and at a minimum idling engine speed in the third embodiment is similar to the operation explained with reference to FIG. 4 and FIG. 5 of the first embodiment. Thus, similarly to the first embodiment, a dead zone is reduced, and in addition fine operability and manipulation handling are improved.

Figure 12:
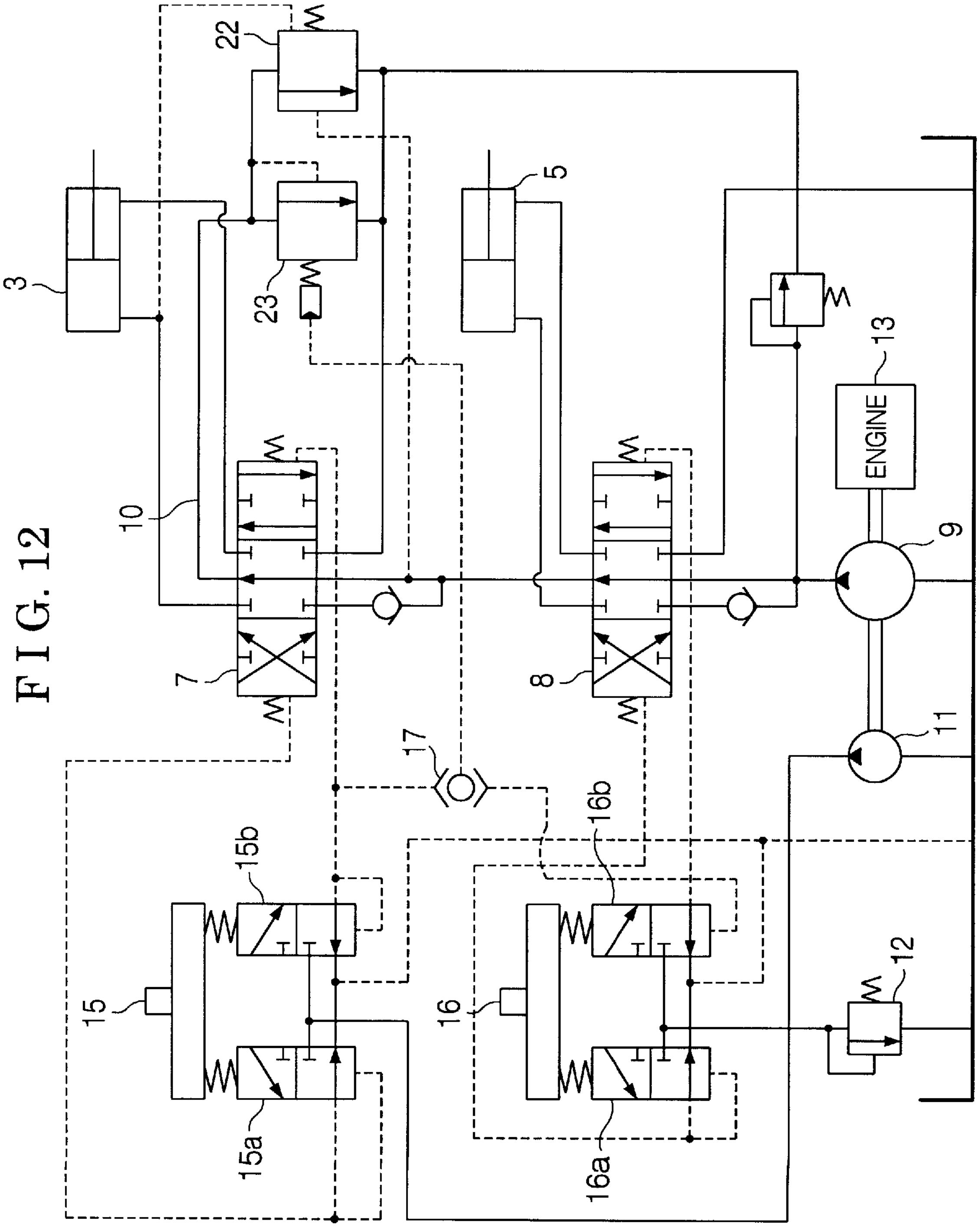
FIG. 12 is a schematic of a fourth embodiment of a hydraulic controller of a working machine according to the present invention.
Figure 13:
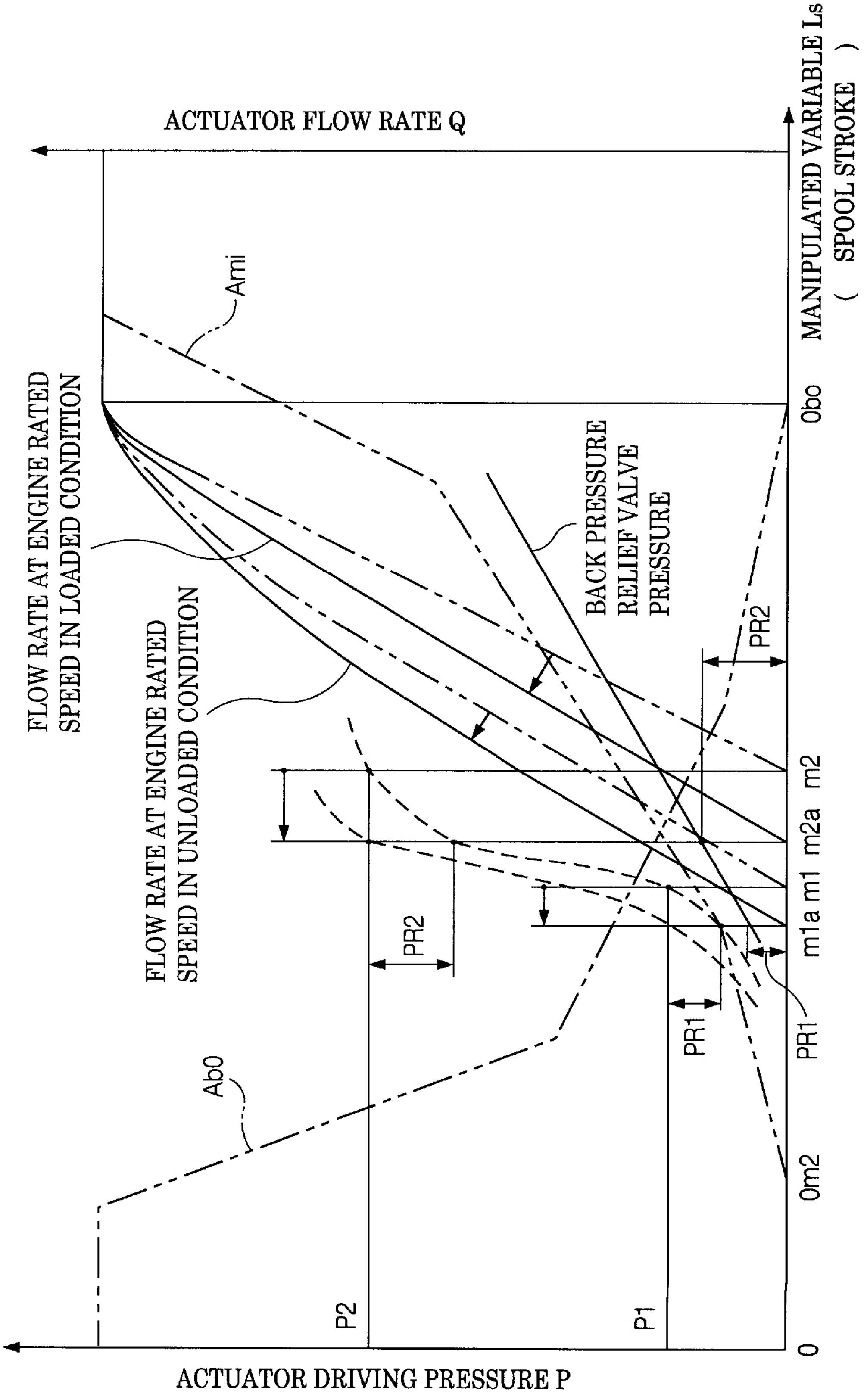
FIG. 13 is a graphical view of the operation, at a minimum idling engine speed, of the fourth embodiment of the present invention.
Figure 14:
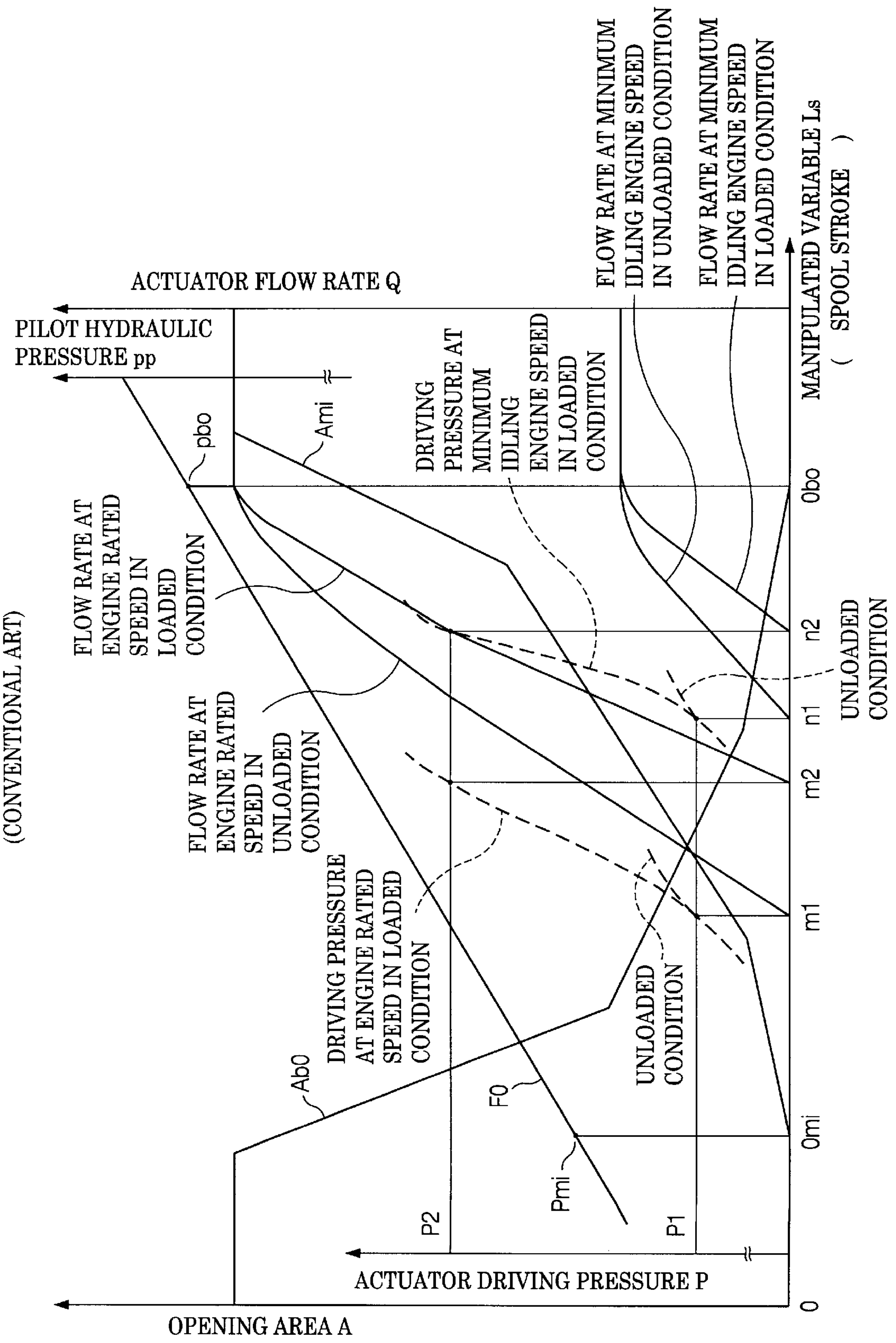
F I G. 14 (CONVENTIONAL ART)
FIG. 14 is a graphical view of the operation of a hydraulic controller of a working machine according to the prior art.

A fourth embodiment of the present invention is described as follows. In the fourth embodiment, as is shown in FIG. 12, as compared to the third embodiment, the back pressure relief valve 23 is substituted for the back pressure metering valve 21, and control pressure is a pilot hydraulic pressure from the proportional pressure control valves 15*b* and 16*b*. The operation at engine rated speed in such a structure is similar to FIG. 7 of the second embodiment, as is shown in FIG. 13. The operation at a minimum idling speed is substantially the same as in FIG. 8 of the second embodiment. Accordingly, in this embodiment, as in the second embodiment, a dead zone is reduced, and in addition fine operability and manipulation handling are improved.

In the third and fourth embodiments, the control of more than one actuator was disclosed. However, the shuttle valves 17 and 18 can be omitted when one actuator is controlled.

Although the present invention has been described with references to presently preferred embodiments, it will be appreciated by those skilled in the art that various modifications, alternatives, variations, etc., may be made without departing from the spirit and scope of the invention as defined in the appended claims.

What is claimed:

1. A hydraulic controller for a working machine, comprising:
- a tank for holding hydraulic oil;
- a lever for operating the working machine;
- an actuator for driving the working machine;
- a hydraulic pump for supplying pressurized oil to said actuator;
- a directional control valve having a pilot portion and a bleed-off opening, said directional control valve being disposed in a line connecting said hydraulic pump and said actuator, said directional control valve for causing an entire flow of pressurized oil from said hydraulic pump to be supplied to said actuator;
- proportional pressure control valve for generating hydraulic pressure according to a position of said lever and for supplying a pilot hydraulic pressure to said pilot portion of said directional control valve;
- a back pressure relief valve, disposed in a bleed-off line connecting the bleed-off opening and the tank, for adding a back pressure to said bleed-off opening;
- a proportional solenoid valve for supplying a control pressure to said back pressure relief valve;
- a pilot hydraulic sensor for detecting a generated pilot hydraulic pressure; and
- a controller for receiving a pilot hydraulic signal from said pilot hydraulic sensor, and for outputting a control signal to said proportional solenoid valve to control said back pressure relief valve.

2. A hydraulic controller for a working machine, as claimed in claim 1, further comprising:

a load pressure sensor for detecting a load pressure of said actuator;

a pump discharge sensor for detecting a discharge quantity of hydraulic oil from said hydraulic pump; and a directional control valve input pressure sensor for detecting an input pressure of said directional control valve, wherein a signal is inputted into said controller from each of said sensors and a control signal is outputted from said controller to said proportional solenoid control valve so that a differential pressure, between the input pressure of said directional control valve and the load pressure of said actuator will not exceed a fixed value as the back pressure of said bleed-off opening is increased according to an increase in said pilot hydraulic pressure.

3. A hydraulic controller for a working machine, comprising:

a tank for holding hydraulic oil;

a lever for operating the working machine;

an actuator for driving the working machine;

a hydraulic pump for supplying pressurized oil to said actuator;

a directional control valve having a pilot portion and a bleed-off opening, said directional control valve being disposed in a line connecting said hydraulic pump and said actuator, said directional control valve for causing an entire flow of pressurized oil from said hydraulic pump to be supplied to said actuator;

a proportional pressure control valve for generating hydraulic pressure according to a position of said lever and for supplying a pilot hydraulic pressure to said pilot portion of said directional control valve;

a back pressure relief valve, disposed in a bleed-off line connecting said bleed-off opening and said tank, for receiving said pilot hydraulic pressure and increasing a back pressure of said bleed-off opening; and a pressure compensating valve, disposed in parallel with said back pressure relief valve in the bleed-off line, for controlling a differential pressure, prior to the operation of said back pressure relief valve, for increasing back pressure when the differential pressure between an input pressure of the directional control valve and a load pressure of the actuator reaches a fixed level.

4. A hydraulic controller for a working machine, comprising:

a tank for holding hydraulic fluid;

a lever for operating said working machine;

a plurality of actuators;

a plurality of tandem circuits, each of said plurality of tandem circuits being provided in one of said plurality of actuators;

a hydraulic pump for supplying pressurized oil to said plurality of actuators;

a plurality of directional control valves, each of said plurality of directional control valves having a pilot portion, each of said plurality of directional control valves being disposed in a line connecting said hydraulic pump and one of said plurality of actuators, said plurality of directional control valves for causing an entire flow of pressurized oil from said hydraulic pump to be supplied to said plurality of actuators; and a proportional pressure control valve for generating hydraulic pressure according to a position of said lever of said working machine and for supplying a pilot hydraulic pressure to each said pilot portion of said plurality of directional control valves;

a pilot hydraulic pressure selection valve for selecting a maximum pilot hydraulic pressure from a pilot hydraulic pressure generated by said plurality of proportional pressure control valves;

a back pressure metering valve, disposed in a bleed-off line connecting a bleed-off opening of a lowest of said plurality of directional control valves of said plurality of directional control valves and said tank, said back pressure metering valve for receiving the maximum pilot hydraulic pressure and for increasing a back pressure of the bleed-off opening;

a load pressure selection valve for selecting a maximum load pressure out from load pressures of said plurality of actuators; and a pressure compensating valve, disposed in parallel with said back pressure metering valve in a bleed-off line in which said back pressure metering valve is disposed, for controlling a differential pressure prior to the manipulation of said back pressure metering valve for increasing back pressure when the differential pressure between an input pressure of an uppermost of said plurality of directional control valves and the selected maximum load pressure reaches a fixed value.

5. A method of controlling a hydraulic circuit for a working machine, comprising the steps of:

adding a back pressure to a bleed-off opening;

supplying a control pressure to a back pressure relief valve;

detecting a pilot hydraulic pressure;

outputting a control signal to a proportional solenoid valve to control a back pressure relief valve.

6. A method of controlling a hydraulic circuit for a working machine, as claimed in claim 5, further comprising the steps of:

detecting a load pressure of an actuator;

detecting a discharge quantity of hydraulic oil from a hydraulic pump;

detecting an input pressure of a directional control valve; and preventing a differential pressure, between said input pressure of said directional control valve and said load pressure of said actuator, from exceeding a fixed value.

7. A hydraulic controller for a working machine, comprising:

a plurality of levers for operating said working machine;

a plurality of actuators for driving said working machine;

a plurality of tandem circuits, each of said plurality of tandem circuits being provided in one of said plurality of actuators;

a hydraulic pump for supplying pressurized oil to said plurality of actuators;

a plurality of directional control valves, each of said plurality of directional control valves having a pilot portion, each of said plurality of directional control valves being disposed in a line connecting said hydraulic pump and one of said plurality of actuators, said plurality of directional control valves for causing an entire flow of pressurized oil from said hydraulic pump to be supplied to said plurality of actuators;

a plurality of proportional pressure control valves for generating hydraulic pressure according to a plurality of positions of said plurality of levers and for supplying a plurality of pilot hydraulic pressures to said plurality of pilot portions of said directional control valves;

a plurality of load pressure sensors for detecting load pressures of said plurality of actuators;

a back pressure metering valve for adding a back pressure to bleed-off openings of said plurality of directional control valves;

a proportional solenoid valve for supplying a control pressure to said back pressure metering valve;

a plurality of pilot hydraulic sensors for detecting said plurality of pilot hydraulic pressures;

a directional control valve input pressure sensor for detecting an input pressure of a first directional control valve of said plurality of directional control valves, said first directional control valve being uppermost of said plurality of directional control valves; and a controller for receiving a plurality of pilot hydraulic signals from said plurality of pilot hydraulic sensors and for outputting a control signal to said proportional solenoid valve to control said back pressure metering valve, wherein the back pressure metering valve is disposed in a bleed-off line of a second directional control valve of said plurality of directional control valves, said second directional control valve being lowest of said plurality of directional control valves.

* * * * *